Dec. 22, 1964 D. R. CAMP 3,162,316
PORTABLE BATCH PLANT
Filed Sept. 5, 1961 3 Sheets-Sheet 1
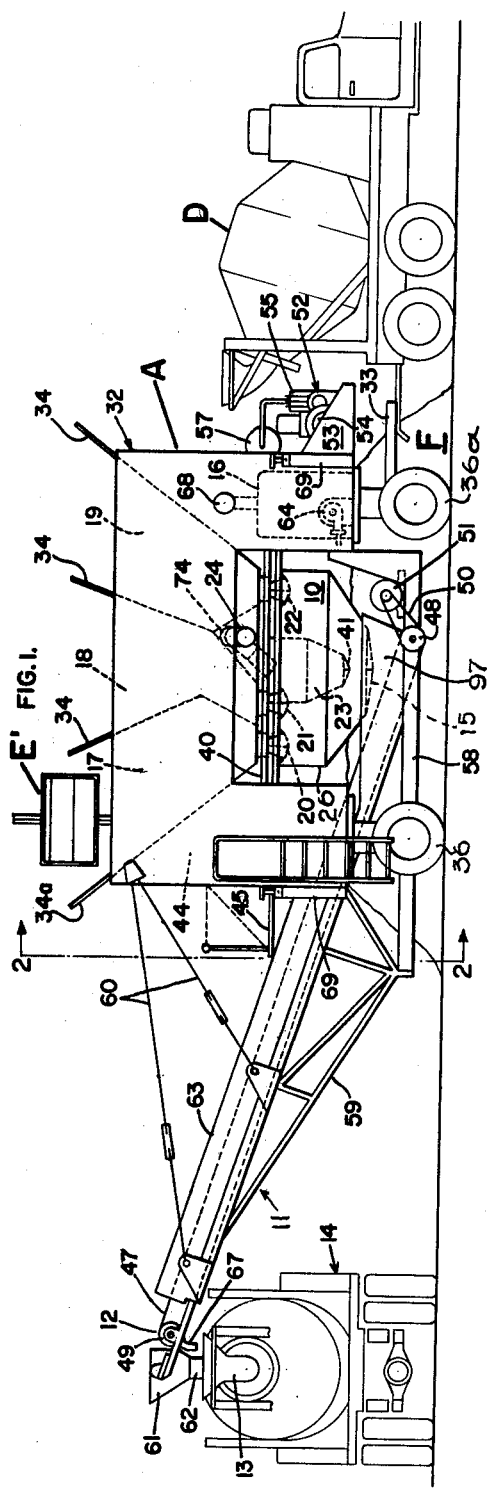
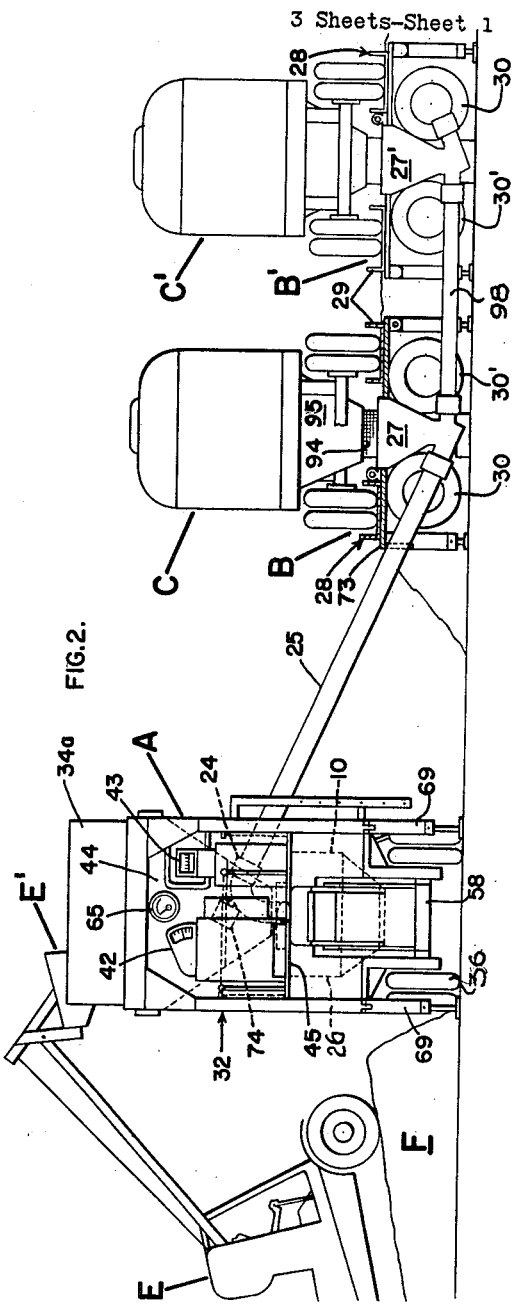
INVENTOR
DARIEL R. CAMP
BY Hansen and Lane
ATTORNEYS

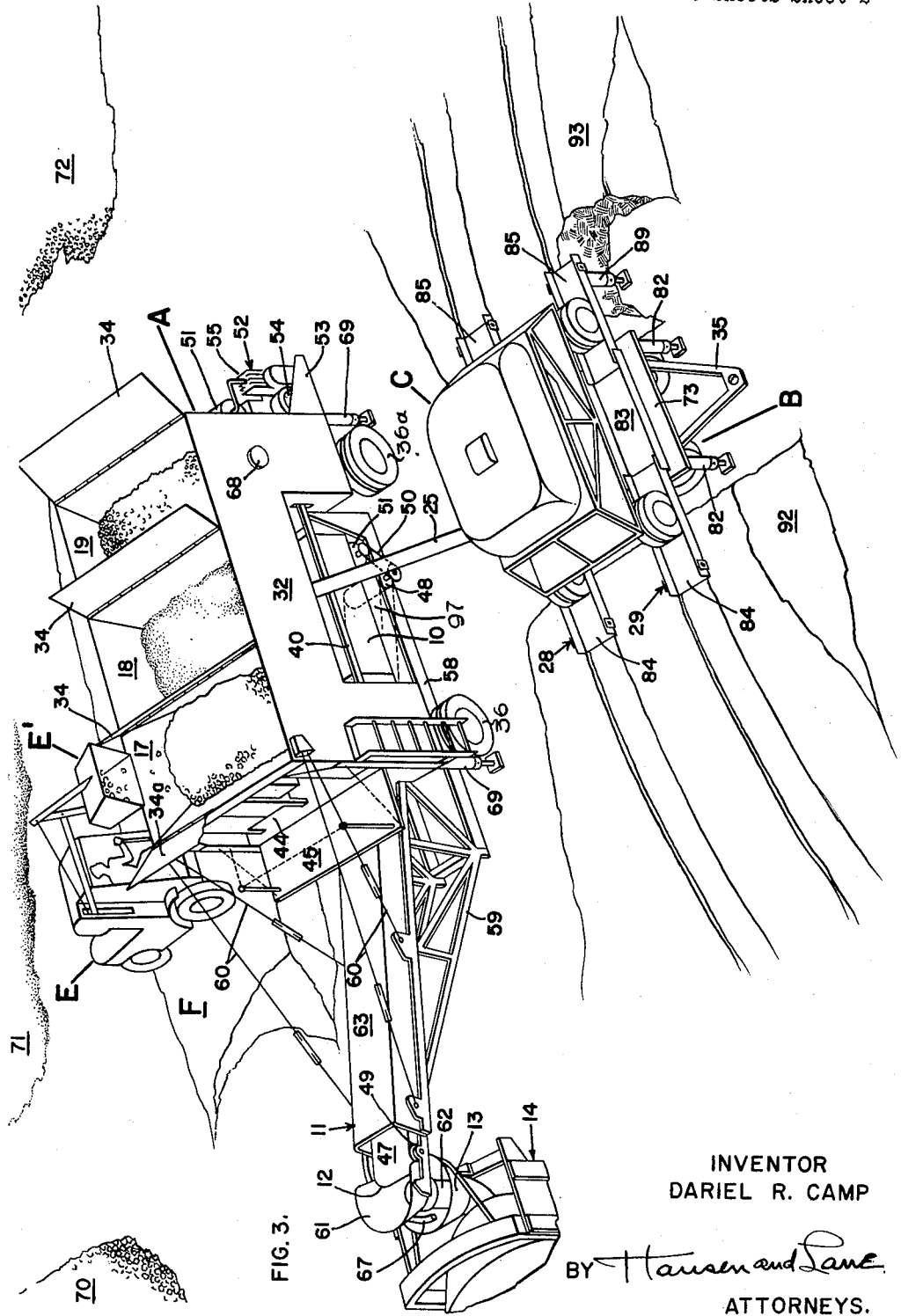

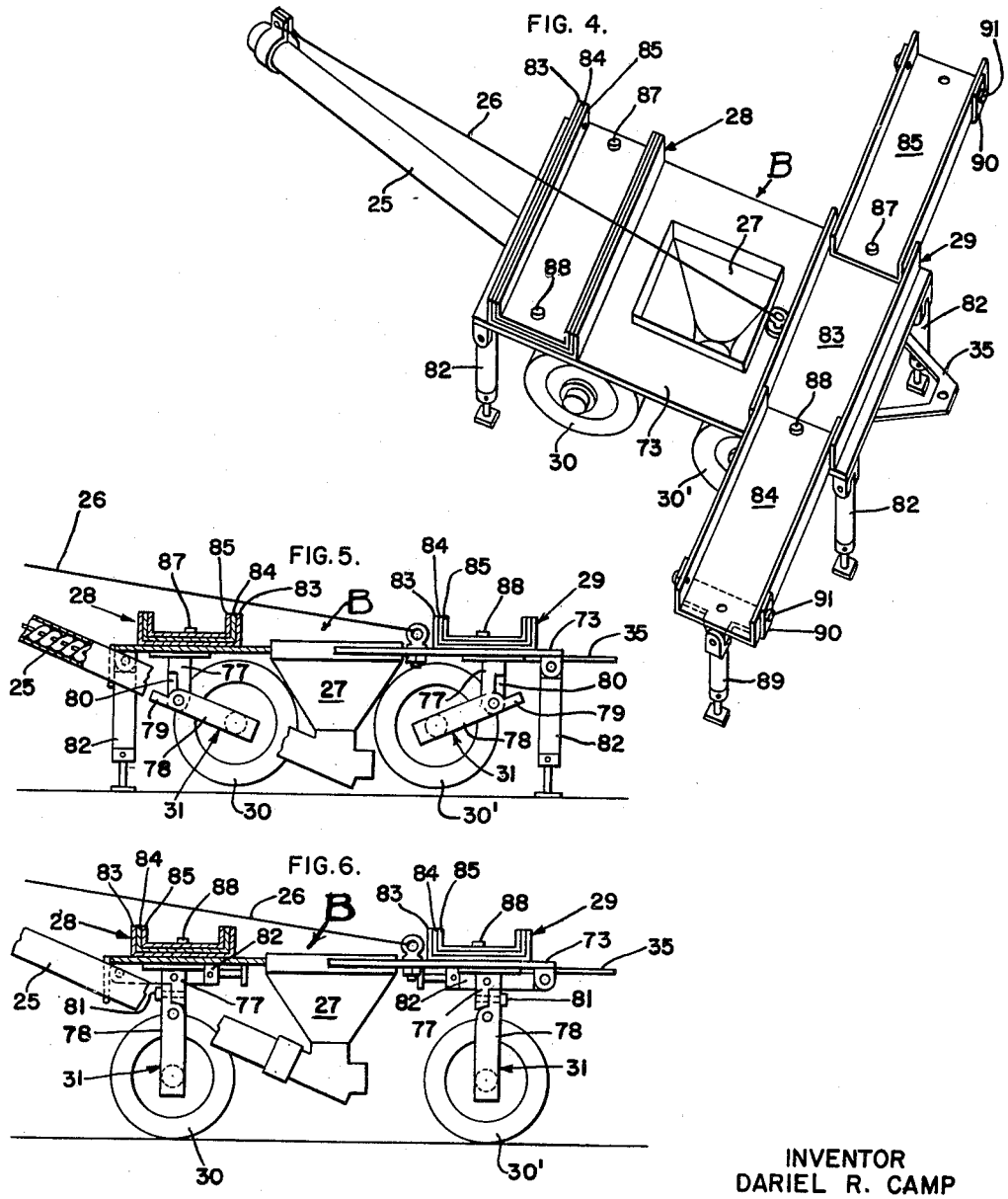

United States Patent Office 3,162,316
Patented Dec. 22, 1964

3,162,316
PORTABLE BATCH PLANT
Dariel R. Camp, 10250 Bret Ave., Cupertino, Calif.
Filed Sept. 5, 1961, Ser. No. 135,866
5 Claims. (Cl. 214—2)

The present invention relates to concrete batching equipment, and pertains more particularly to a fully portable, high capacity, concrete batching plant.

Up until a few years ago concrete batch plants of large capacity were large, expensive, permanently mounted structures, with large overhead hoppers for the sand, aggregate and cement, and which the hoppers discharged by gravity into a weigh batcher, which in turn discharged its contents into a concrete mixing truck mounted therebeneath. On January 6, 1959, Patent No. 2,867,336 was issued, the present inventor being one of the joint patentees thereof, for a large capacity, mobile batch plant. Since that date, large numbers of mobile batch plants embodying the invention of said patent have been made and sold, not only throughout the United States, but also in many foreign countries.

The present invention contemplates the provision of an improved, batch plant, and one which combines a large output capacity, with easy portability and low cost.

Another object of the invention is to provide a highly portable concrete batch plant of large capacity and one wherein the cement requirements of the plant can be maintained at full, continuous capacity without the need for cement storage facilities embodied in the plant.

Another object of the invention is to provide an improved and simplified, large capacity, full portable concrete batch plant.

These, and other objects and advantages of the invention, will be apparent from the following description and the accompanying drawings, wherein:

FIG. 1 is a side elevational view of a portable batch plant embodying the invention as it appears when hitched to a towing truck for towing from one location to another, a second concrete mixing truck being shown in position to receive batched material discharged by the plant.

FIG. 2 is a view looking in the direction of the arrows 2—2 in FIG. 1 with the plant erected ready for operation, the batched material conveyor being removed, and an aggregate loader and a pair of hopper bottom cement trucks being shown mounted on platform hoppers for delivering cement to the batch plant.

FIG. 3 is a perspective view showing the batch plant of FIGS. 1 and 2 in operation, portions being broken away.

FIG. 4 is a perspective view looking angularly downwardly on a platform trailer for receiving cement from a hopper bottom cement truck mounted thereon and delivering such cement to the batcher.

FIG. 5 is a side elevational view of the platform trailer shown in FIG. 4 as it appears when supported on jacks and with the wheels thereof retracted, portions thereof being broken away.

FIG. 6 is a view similar to FIG. 5 showing the wheels extended to support the vehicle for towing, portions being broken away.

Briefly, the illustrated form of the invention comprises a trailer A, which may be generally similar to the aggregate and weigh batcher portion of the mobile concrete batching plant disclosed in Patent No. 2,867,336, with the exception that a weigh batcher 10 of the present invention is mounted above the lower end of a batch material conveyor 11, which in turn is mounted with adequate road clearance as an integral part of the batching trailer A. The discharge end 12 of the batch materials conveyor 11 is at a height to discharge into the receiving hopper 13 of a conventional concrete mixing truck 14 spotted therebeneath. The weigh batcher 10 is provided with a usual, power actuated gate 15 for discharging its contents by gravity onto the conveyor 11. Suitable means are provided for supplying the water for mixing with each batch of dry materials delivered, such as, for example, a water tank 16.

A plurality of hopper-like bins 17, 18 and 19 are provided in the upper portion of the trailer body A for receiving, respectively, sand, and different sizes of aggregate. The bins are provided with individual discharge gates 20, 21 and 22 for discharging controlled amounts of the contents of the individual bins 17, 18 and 19 by gravity into the conventional weigh batcher 10. A usual cement weighing hopper 23 is provided as a separate unit in the weigh batcher 10, and cement is discharged into this compartment through a discharge spout 24, secured to the trailer A, and adapted to be coupled to the upper end of a cement conveyor 25.

The lower end of the cement conveyor 25 communicates with a cement receiving hopper 27 mounted in a hopper trailer B, adapted to support a conventional, hopper-bottom cement trailer C. Cement is discharged from the trailer C by opening the usual hopper gates thereof and allowing the contents of the cement trailer to gravitate into the hopper 27. This provides a continuous supply of cement for the cement conveyor 25 until the entire contents of the cement trailer C have been used. The hopper trailer B, as best shown in FIGS. 4–6, has extensible tracks 28 and 29 for guiding and supporting a hopper-bottom cement trailer C thereon. The supporting wheels 30 of the hopper trailer B are mounted on retractable supports 31, which allow the wheels 30 thereof to be retracted from their highway transporting condition of FIG. 6, to that of FIG. 5.

Referring to the drawings in greater detail, the batching trailer A comprises a body 32, which may be constructed, in accordance with usual trailer building practice, of structural steel or aluminum and sheet and plate metal. The trailer body 32 is mounted on non-dirigible rear wheels 36 and dirigible front wheels 36a. The front wheels are provided with suitable towing means, such as, for example, a tongue 33, for hitching the trailer A to a towing vehicle, such as a truck D as in FIG. 1. Hinged extension wings 34 are provided between adjacent sand and aggregate bins 17, 18 and 19, and at the ends of the trailer A, to guide the sand and aggregate into their respective bins.

The power actuated discharge gates 20, 21 and 22 control gravity discharge of the contents of the bins 17, 18 and 19 into the aggregate compartment 26 of the weigh batcher 10, the aggregate compartment being mounted in a usual manner on conventional scale beams 40. The cement hopper 23 is also mounted on usual scale beams in the weigh batcher 10, and is provided with a conventional, power actuated gate 41 to control the gravity discharge of its contents, along with the other batch materials in the weigh batcher 10 onto the conveyor 11 therebeneath. The respective weights of sand and aggregates in the weigh batcher 10, and of cement in the cement hopper 23 are indicated by usual indicators, such as, for example, scale dials 42 and 43. These dials, as well as such other indicating and control mechanisms as may be desired, are mounted in an operator's compartment 44 provided in the rear of the body 32. When lowered, the rear hinged extension wing 34a also serves as a closure door for the upper portion of this compartment 44, while an operator's platform 45 is hingedly connected to the body 32 in a manner to permit it to be swung upwardly to provide a closure door for the lower portion of this compartment.

The batch materials conveyor 11 may be of a conventional, belt type, the belt 47 of which passes around a power driven head roller 48 at its lower end, and an idler or tail roller 49 at its upper end. The head roller 48 is driven by belting 50 from an electric motor 51, which preferably is of the gear reduction type to provide a suitable operating speed for the conveyor belt 47. Electrical energy for driving the conveyor motor 51, as well as for other power electrically energized portions of the illustrated embodiment of the invention, may be supplied either from a usual electrical power line (not shown) if available at the site, or by means of a power plant mechanism 52 mounted on a shelf 53 secured to the trailer body 32.

As illustrated, the power plant mechanism 52 comprises a conventional gasoline- or diesel-electric generator 54, and preferably includes also a power driven air compressor 55 for supplying compressed air to a storage tank 57, from which conventional high pressure hoses or pipe lines (not shown) may be used to convey the compressed air to any desired point on the site. For example, the discharge gates 20, 21 and 22 of the sand and aggregate storage bins 17, 18 and 19, the gates 15 and 41 of the weigh batcher 10 and the cement hopper 23 may be operated by suitable power means, energized, for example, by electricity or compressed air at the election of the designer, builder, or owner of the batch plant.

The lower end of the batch materials conveyor 11 is supported on a horizontal frame 58 which may be of structural metal members, and is secured at its forward end, as by welding, to the trailer body 32. The rear end of the conveyor frame 58 may be similarly secured to the trailer body 32. A rearwardly projecting portion of the batch materials conveyor 11 is supported in part by a truss 59 of structural metal members, and in part by tension cables 60 secured to the trailer body 32.

A usual loading spout 61 is provided at the upper, or discharge end 12 of the batch materials conveyor 11 to guide the batch materials discharged thereby into the usual loading hopper 13 of a conventional concrete mixing truck 17 when spotted thereunder. A canvas boot 62 depends from the lower end of the loading spout 61, and is of a length to extend into the truck loading hopper 13 to minimize air-borne loss of cement particles. A usual hood or canopy 63 also may be provided over the conveyor 11 to prevent the loss of air-borne cement particles from batch materials on the conveyor 11.

The water tank 16 is provided with a conventional, electrically driven water pump 64, and usual piping (not shown) is provided to conduct water from this tank through a meter 65 (FIG. 2) in the operator's compartment 44 and thence along the batch materials conveyor 11 to a discharge outlet 67, whence it is discharged into the truck hopper 13 under the control of an operator in the operator's compartment 44 to provide a required amount of water for each batch of dry materials discharged into a mixing truck 14.

The water tank 16 may be filled from an ordinary tank truck through a usual filler spout 68 (FIG. 1) communicating with the water tank 16. In the event that a supply of pressurized water is available at the site, connection thereto may be made from a usual water main outlet (not shown). Since the piping, necessary valves and fittings, and their manner of installation for making such connection are well known to those familiar with the design and operation of a batch plant it will be unnecessary to illustrate or describe them in detail herein.

A jack 69 is provided for each corner of the batching trailer A, and, as illustrated, these jacks are hingedly connected to the trailer body 32. When transporting the trailer A the jacks 69 are swung upwardly to their inoperative position alongside the trailer body 32 as shown in FIG. 1. When the trailer is to be set up for use, these jacks are swung downwardly as shown in FIG. 2, and are extended sufficiently to take at least a part of the weight of the body 32 off the wheels 36 before loading sand and aggregate into the bins 17, 18 and 19 in the trailer body.

During operation of the present batch plant, sand and gravel or crushed rock are supplied to their respective compartments 17, 18 and 19 by means of a conventional scoop loader, such as, for example, the one E shown in FIGS. 2 and 3, and the scoop E' of which is also shown in FIG. 1. In order to permit the use of a relatively low lift type of loader, an earth fill ramp F preferably is prepared by one of the earth moving machines on the job, such as the scoop E or a bulldozer. The ramp F preferably is topped off with gravel to provide a good operating surface for the loader E. The sand and aggregate materials to be batched are dumped near the trailer A in separate piles 70, 71 and 72 (FIG. 3) and these piles are kept replenished as required by conventional dump trucks (not shown).

A feature of the present invention resides in the fact that no cement storage facilities at all are required in or for the plant. Instead, ordinary hopper-bottom cement delivery trailers, such as the trailers C and C' (FIGS. 1–3) many of which are constantly on hand at any large concrete mixing job, are themselves used as the cement storage supply. In order to permit this use of conventional cement trailers, portable hopper means, such as, the illustrated hopper trailer B, is provided for supporting a cement trailer C thereon as shown in FIGS. 2 and 3. The illustrated hopper trailer B comprises a bed 73 having the cement receiving hopper 27 mounted therein. The cement conveyor 25, which is herein illustrated as a conventional screw conveyor, communicates with the lower end of the cement receiving hopper 27, and is powered in a conventional manner by an electric driven motor 74. Suitable controls (not shown) for the motor 74, as well as controls for other power driven elements of the present batch plant, may be provided in the operator's compartment 44.

For normal batching requirements, a single hopper trailer B is usually adequate, but if continuous, maximum output is required, a second hopper trailer B' may be provided alongside the first one and the cement receiving hoppers 27 and 27' of the two hopper trailers are operatively interconnected or "siamesed," as illustrated in FIG. 2. Thus, during the times that a primary cement trailer C which has been emptied is being replaced with a full one, cement will still be available from the standby cement trailer C'.

The hopper trailer B, best shown in FIGS. 4–6, has non-dirigible rear supporting wheels 30 and dirigible forward supporting wheels 30', the latter of which are provided with towing means, such as a tongue 35. Each retractable wheel support 31 comprises a fixed, upright upper portion 77, and a hingedly connected lower portion 78, with an extension 79 thereon adapted to fit into a notch 80 provided therefor in its associated upper portion 77.

When the wheels 30 and 30' are used to support the hopper trailer B for towing, the wheel supports 31 are secured in their extended position as shown in FIG. 6 by cap screws 81. The latter are inserted through holes provided therefor, one in each of the extensions 79, and are screwed into registering, threaded holes provided therefor in the associated upper portions 77. Jacks 82, of less height than the trailer bed 73 when the latter is supported on the wheels 30 as shown in FIG. 6, are hingedly mounted, one on each corner of the bed 73. Before retracting the wheels 30 to their position of FIG. 5, these jacks are swung downwardly. The cap screws 81 are then removed, and the lower wheel support portions 78 are swung inwardly to their retracted positions of FIG. 5.

The extensible track assemblies 28 and 29 are secured, respectively, to the forward and rearward ends of the hopper trailer bed 73. Each of these track assemblies comprises a fixed track member 83, with a pair of similar, but successively narrower, channeled track extensions 84 and 85 nested therein as shown at the left or rear end of the hopper trailer B of FIG. 4. When thus nested, each pair of track extensions 84 and 85 are anchored to their respective fixed track members 83 by pins 87 and 88, which are inserted in registering holes provided therefor in all three of the track members of each set. Each pair of the nested track extensions 84 and 85 are adapted to be extended from opposite ends of their respective fixed track members 83 as shown in FIG. 4, in which extended position they are anchored against endwise displacement by the same pins 87 and 88 reinserted as shown in the latter figure.

A jack 89 is provided for supporting the outer end of each track extension 84 and 85, and each jack 89 is provided with a transverse head member 90, which is attached to the outer end of its associated track extension, such as the extension 84 shown in FIG. 4, by screws 91. The latter are inserted through holes provided therefor in the head member 90, and are screwed into threaded holes provided therefor in each track extension. These jacks 89 are adjusted in height so as to substantially level the track extensions 84 and 85 with their respective fixed channel track members 83 as shown in FIG. 3, and at the right in FIG. 4.

Gravel topped, earth fill ramps 92 and 93 are provided in the same manner as that explained previously herein for the ramp F of FIGS. 2 and 3 for towing cement trailers C onto the hopper trailer B.

In using the illustrated embodiment of the present invention, in order to minimize the time that the trailers A and B spend on a job, it is usually preferred to provide in advance of their arrival sufficient batching material in storage piles 70, 71 and 72 (FIG. 3) to start the job, and also to provide the scoop loader ramp F (FIGS. 1 and 3) and partially built hopper trailer ramps 92 and 93 (FIG. 3).

Upon the completion of this preliminary preparation, the batching trailer A, and one or two of the hopper trailers B, as required, are then towed into position on the job site. The batching trailer A is spotted alongside the scoop loader ramp F, and the jacks 69 on the corners of the batching trailer A are lowered and set as shown in FIGS. 2 and 3, and as described previously herein. The extension wings 34 are elevated to operative position as shown in FIGS. 1, 2 and 3, the operator's platform 45 is swung down to horizontal position, and the scoop loader E can then immediately begin filling the respective bins 17, 18 and 19 with sand and required sizes of gravel or crushed rock.

During the time the batching trailer A is being spotted and prepared for operation as described in the preceding paragraph, the hopper trailer B is backed into position between the previously partly prepared ramps 92 and 93, the cement conveyor 25 being guided during this movement into interfitted relation with the cement discharge spout 24 on the batching trailer A.

The cement conveyor guy cable 26 is then removed until the hopper trailer B is again to be prepared for transporting, the jacks 82 are swung downwardly, and the wheels 30 are retracted to their positions of FIG. 5 to allow the trailer bed 73 to rest on the jacks 82.

The track extension jacks 89 are mounted on their respective track extensions 84 and 85, and the latter are extended and anchored by their pins 87 and 88. The hopper trailer ramps 92 and 93 are then completed.

A loaded cement trailer C is then towed into position as shown in FIG. 3, and is spotted over the cement receiving hopper 27 of the hopper trailer B, a canvas boot 94 (FIG. 2) is fitted around the bottom of the discharge hopper 95 of the cement trailer C, and the usual hopper gates (not shown) of the cement trailer are opened to allow cement from the trailer to gravitate into the cement receiving hopper 27. With an operator, not shown, on the platform 45, the cement conveyor 25 is actuated as explained previously herein to discharge a required weight of cement into the cement hopper 27, and the bin gates 20, 21 and 22 are operated in required succession to permit required weights of sand and aggregate to gravitate into the weight batcher 10.

These dry batch ingredients are then discharged through the weigh hopper gates 15 and 41 onto the batch materials conveyor 11, a sheet metal shield 97 preferably being provided around the lower end of the batch materials conveyor 11 to prevent spillage of the batch materials when they are thus discharged into the conveyor. The batch materials are carried upwardly by the conveyor 11, are discharged over the idler or tail roller 49, and gravitate through the loading spout 61 into the receiving hopper 13 of a mixing truck 14 which has been spotted therebeneath. Water for each batch of the dry materials is also discharged into the waiting mixing truck 14 through the spout 67 in a metered quantity determined by the operator.

In the event that maximum, uninterrupted output is required from the present batching plant, a second hopper trailer B' may be mounted laterally alongside the first one B as shown in FIG. 2, and in such case the ramps 92 and 93 are extended, as also shown in FIG. 2, to provide access to this second hopper trailer. A screw conveyor extension 98 is provided between the hoppers 27 and 27' of the two hopper trailers B and B' to feed cement from the second hopper 27' into the base of the primary hopper 27 as required. A standby cement trailer C' supported on the second hopper trailer B' may then supply cement to the batching trailer A each time that an empty cement trailer is being replaced by a filled one over the primary hopper 27.

The invention provides a fully portable batching plant, and one with tremendous capacity. It is very inexpensive to build and operate, and is so small that no problems of highway limitations are involved under the laws of any of the United States.

By employing conventional hopper bottom cement trailers, such as the trailer C, as the cement storage supply for the plant, an extra handling operation of cement at the batch plant is avoided, and the problem of weather protection for the cement is solved, since these trucks are weather tight, and several of them are always on hand on any job large enough to warrant the use of a batch plant.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims:

1. A portable concrete batching mechanism comprising a trailer type vehicle, a body on said vehicle, a plurality of hopper bottom sand and aggregate bins in said body, an individual discharge gate in the lower end of each of said sand and aggregate bins, a weigh batcher mounted beneath said sand and aggregate bins and in position to receive material gravitating through all of said sand and aggregate bin gates, an individual cement compartment in the weigh batcher, a batch materials conveyor mounted with a receiving end thereof beneath the weigh batcher and above a supporting surface upon which the vehicle rests, gate means in the weigh batcher and in the cement compartment for gravity discharge of the contents thereof onto the receiving end of the batch materials conveyor mounted therebeneath, said batch materials conveyor sloping upwardly and extending endwise beyond the vehicle body to a height to discharge material from the upper end thereof into the receiving hopper of a selected cement mixing truck, support means extending from projecting end portions of the conveyor to the vehicle body, a cement receiving mechanism for mounting on the ground adjacent said trailer type vehicle, a cement receiving hopper in the cement receiving mechanism, a pair of track members mounted on the cement receiving mechanism, one on each side of the cement receiving hopper, for supporting thereon a hopper bottom cement truck having a gravity discharge hopper in the bottom thereof with the discharge hopper of the cement truck spotted over the cement receiving hopper of the cement receiving mechanism, a cement conveyor communicating with the lower end of the cement receiving hopper on said cement receiving mechanism and positioned to convey cement in controlled amounts from the cement receiving hopper into the cement compartment within the weigh batcher.

2. A portable concrete batching mechanism comprising a trailer type vehicle, a body on said vehicle, a plurality of sand and aggregate bins in said body, a weigh batcher mounted beneath said sand and aggregate bins and in position to receive material gravitating through said sand and aggregate bins, means for controlling the gravity discharge of each sand and aggregate bin into the weigh batcher, an individual cement compartment in the weigh batcher, a batch materials conveyor mounted with a receiving end thereof beneath the weigh batcher and above a supporting surface upon which the vehicle rests, means controlling gravity discharge of the contents of the weigh batcher onto the receiving end of the batch materials conveyor mounted therebeneath, said batch materials conveyor sloping upwardly and extending beyond the vehicle body to a height to discharge material from the upper end thereof into the receiving hopper of a selected concrete mixing truck, support means extending from projecting portions of the conveyor to the vehicle body, a dust tight cement conveying mechanism mounted with one end thereof positioned to discharge into the cement compartment of the weigh batcher, a cement receiving hopper connected in dust tight relation to the other end of said cement conveying mechanism, and means for supporting the receiving hopper beneath the discharge opening of a bottom discharge cement truck to receive cement gravitating therefrom, whereby controlled operation of the cement conveying mechanism conveys cement in controlled amounts from the cement truck into the cement compartment of the weigh batcher.

3. A two vehicle portable concrete batch plant comprising a first trailer type vehicle, a body on said first vehicle, a plurality of sand and aggregate bins in said body, a weigh batcher mounted beneath said sand and aggregate bins and in position to receive material gravitating through said sand and aggregate bins, means for controlling the gravity discharge of each sand and aggregate bin into the weigh batcher, an individual cement compartment in the weigh batcher, a batch materials conveyor mounted with a receiving end thereof beneath the weigh batcher and above a supporting surface upon which the vehicle rests, means controlling gravity discharge of the contents of the weigh batcher and said cement compartment onto the receiving end of the batch materials conveyor mounted therebeneath, said batch materials conveyor sloping upwardly to a height to discharge material from the upper end thereof into the receiving hopper of a selected cement mixing truck, a second cement receiving and conveying vehicle for mounting adjacent the first vehicle, support tracks on said second vehicle for supporting a bulk cement truck thereon, and a cement conveyor mounted on the second vehicle with one end thereof positioned to receive cement discharged from a bulk cement truck on said tracks and to convey such cement into the cement compartment in the weigh batcher.

4. A two vehicle portable concrete batch plant comprising a first trailer type vehicle, a body on said first vehicle, a plurality of sand and aggregate bins in said body, a weigh batcher mounted beneath said sand and aggregate bins and in position to receive material gravitating through said sand and aggregate bins, means for controlling the gravity discharge of each sand and aggregate bin into the weigh batcher, an individual cement compartment in the weigh batcher, a batch materials conveyor mounted with a receiving end thereof beneath the weigh batcher and above a supporting surface upon which the vehicle rests, means controlling gravity discharge of the contents of the weigh batcher and said cement compartment onto the receiving end of the batch materials conveyor mounted therebeneath, said batch materials conveyor sloping upwardly to a height to discharge material from the upper end thereof into the receiving hopper of a selected cement mixing truck, a second cement receiving and conveying vehicle for mounting adjacent the first vehicle, a cement receiving hopper in said second vehicle, a pair of longitudinally extensible support tracks on said second vehicle for supporting a bulk cement truck thereon, said tracks being extensible to a position with the ends thereof projecting beyond said vehicle, jack means for supporting the projecting end positions of said tracks, to support a hopper bottom cement truck thereon in spotted position over the hopper of said second vehicle, and a cement conveyor mounted on the second vehicle with one end thereof communicating with a lower portion of the hopper of said second vehicle and the upper end thereof positioned to discharge into the cement compartment in the weigh batcher.

5. A portable concrete batch plant comprising a wheeled vehicle, a plurality of open top sand and aggregate bins on said vehicle, said bins being of a size to hold quantities of sand and aggregate in excess of that required for a single batch of concrete of known quantity, a weigh batcher mounted beneath said bins and in position to receive material gravitating through said bins, means for controlling the gravity discharge of each sand and gravel bin into the weigh batcher, and individual cement compartment in the weigh batcher, a batch materials conveyor mounted with a receiving end thereof beneath the weigh batcher for receiving batch materials gravitating from the weigh batcher, said batch materials conveyor sloping upwardly to a height to discharge material from the upper end thereof into the receiving hopper of a selected concrete mixing truck, a dust tight cement chute mounted with a discharge end thereof positioned to discharge into the cement compartment of the weigh batcher, a receiving hopper constructed and arranged for mounting beneath the discharge opening of a bottom discharge cement truck to receive cement gravitating therefrom, the other end of the cement chute being connected to open into said receiving hopper, and controlled cement conveyor means for conveying cement from said receiving hopper through said chute and into the cement compartment of the weigh batcher, whereby each such cement truck remains in cement discharging relation with the receiving hopper until either such cement truck is empty, or a required amount of cement therefrom has been conveyed through the cement chute and into the cement compartment in the weigh batcher.

References Cited in the file of this patent

UNITED STATES PATENTS

| | | |
|---|---|---|
| 2,310,592 | Noble | Feb. 9, 1943 |
| 2,867,336 | Soldini | Jan. 6, 1959 |
| 2,873,036 | Noble | Feb. 10, 1959 |
| 2,896,771 | Mecham | July 28, 1959 |